Jan. 24, 1928.
H. S. POTTER
1,657,317
HAMMER ROCK DRILL
Original Filed Feb. 26, 1925
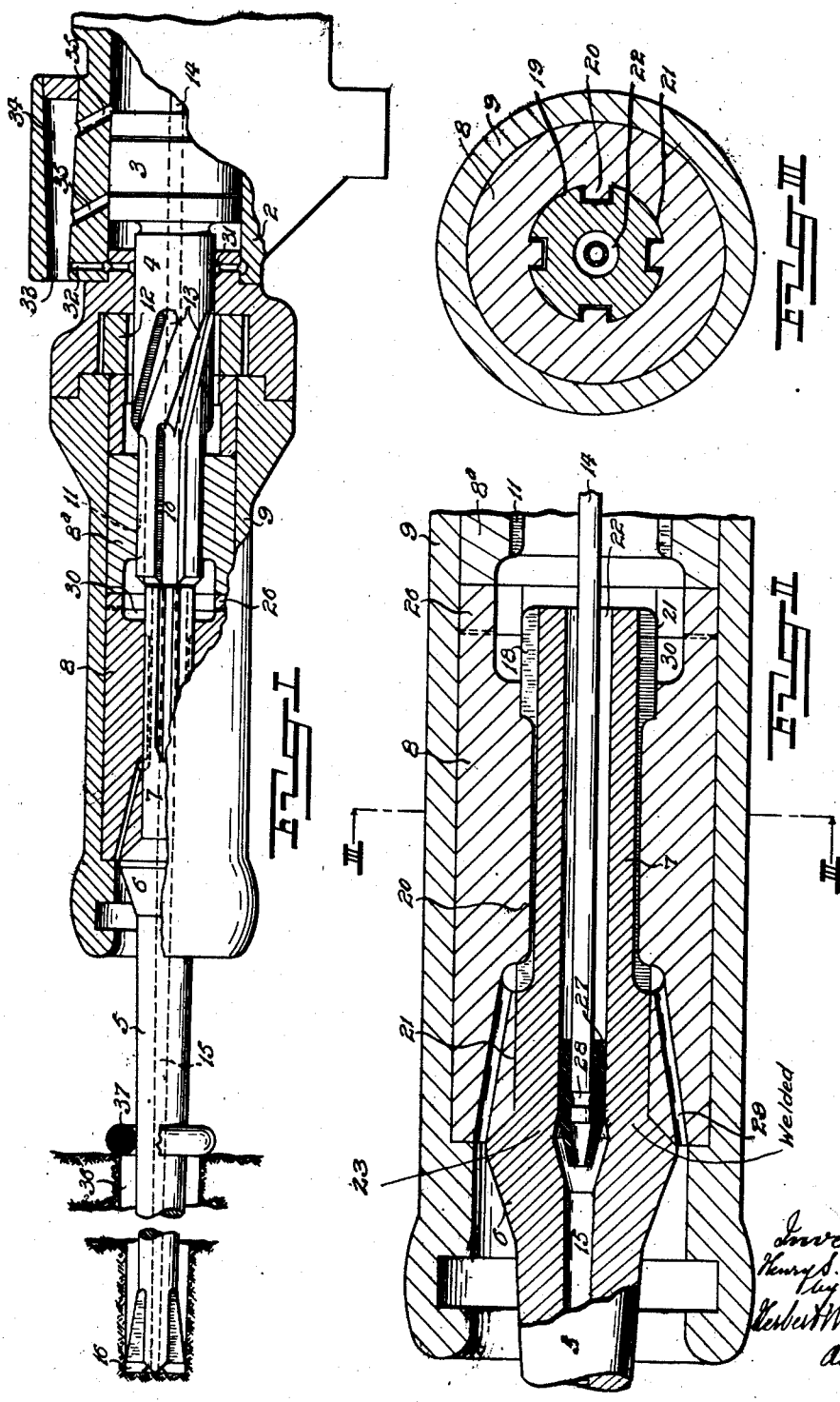

Patented Jan. 24, 1928.

1,657,317

UNITED STATES PATENT OFFICE.

HENRY SAMUEL POTTER, OF JOHANNESBURG, TRANSVAAL, SOUTH AFRICA.

HAMMER ROCK DRILL.

Original application filed February 26, 1925, Serial No. 11,726, and in the Union of South Africa November 3, 1924. Divided and this application filed December 17, 1925. Serial No. 76,123.

The present invention refers to hammer rock drills in which the hollow drill tool is so mounted in the chuck of the machine as to be rotated thereby, whilst being free for axial movement.

One of the purposes of the invention is to provide an improved form of chuck suitable for use with the drill tool described in application No. 11,726, filed February 26th 1925, from which the present application is a division.

Another purpose is to provide improved means for preventing air from passing into the drilled hole.

In the accompanying drawings—

Fig. I is a partly sectioned longitudinal view of a hammer rock drill embodying the invention.

Fig. II is a similar but enlarged view of a portion thereof, the joint between the shank and stem being shown in section and after the parts are welded together.

Fig. III is a cross section on III—III of Fig. II.

In the drawings 2 indicates the cylinder of a pneumatic rock drill. 3 is the hammer piston working in the cylinder, and having a forwardly extending nose 4 which strikes the drill tool 5, 6, 7.

The tool is supported at its rear end in the tool chuck 8, 8ª. The latter is mounted in the casing 9 of the rock drill so as to be rotatable; and it is rotated in the example shown by the hammer piston 3, the nose 4 of which is for this purpose provided with longitudinal flutes 10 co-operating with similar flutes 11, in the interior of the chuck portion 8ª. The hammer itself is caused to rotate by the engagement of a ratchet mechanism 12 with helical flutes 13 on the hammer. This ratchet mechanism is of any approved construction. 14 is the usual axial water tube which passes water into the bore 15 of the drill tool, for delivery at the cutting end of the tool.

The drill tool comprises the stem 5 at the forward end of which is formed the cutting edges 16, the circumferential projection 6 which bears on the front end of the chuck 8 and limits the penetration of the tool into the chuck 8, and the shank 7 which seats in and is engaged rotationally by the chuck.

The stem 5 is preferably tapered forwardly. The shank 7 is of cylindrical form, and it engages the chuck portion 8 for rotation, by means of longitudinal flutes 18, 19 formed on the shank and said chuck portion respectively. In the latter the ribs 20 between the flutes stop short of the end so as to leave at each end a cylindrical seating 21. The shank seats in said seatings and is thereby held accurately in the axis of the machine.

This form of shank is preferably a separate part which is accurately machined during manufacture and is subsequently welded to the stem 5 at 23 but the stem 5 may be secured permanently to the shank 7 in any other approved way. Being separately manufactured it can be made of greater diameter than the stem; whilst its bore 22 can be considerably larger in diameter than the bore 15 of the stem, and of ample diameter to accommodate the water tube 14. Also the true seating of the shank in the chuck keeps the shank bore and the water tube always co-axial with one another. Consequently the water tube can without danger be taken right through the shank as shown, so that it projects the water well into the bore 15 of the stem and leakage of water backwards is rendered difficult.

The chuck is shown in two parts which are connected by dog clutch teeth 26; the intention being that standardized front portions 8 should be supplied which suit the above described drill shanks and at the same time can be fitted to rear portions 8ª suitable for the particular kind of rock drill; the said rear portions being specially made for the purpose by the drill maker or being formed from existing chucks. The chuck portion 8 with its ribs 20 may be cast in suitable metal, machining being limited to the outside and end surfaces and the seatings 21, so that this chuck portion may be cheaply replaced when it fails to hold the drill properly in line.

In some hammer drills, air from the cylinder is allowed to pass into the tool bore with the water to assist in clearing the bore hole in the rock. To prevent an undue quantity of air passing down by reason of the large space provided by this invention between the water tube and the bore, said space may be obstructed by for instance an enlargement on the tube such as that indicated by 27. The enlargement shown is intended to prevent the passage of air altogether, so that the bore hole is cleaned by water only; and to that end it consists of a rubber sleeve secured on the end portion of the water tube, and externally fitting the bore 22 of the shank. The sleeve 27 projects beyond the end of the water tube and terminates in a conical nozzle. Owing to the wide bore of the shank permitting the water tube to extend well forward the sleeve 27 is readily accessible from the mouth of the drill casing for replacement when necessary.

The sleeve 27 is retained in place by gripping into an annular recess 28 formed around the tube. Said recess is formed by pressing in the metal of the tube, the pressed-in ring contracting the stream of water as it leaves the tube so assisting to form said stream into a compact and non-expanding jet which readily passes down to the tool bore with minimum loss of energy.

The possibility of air leaking into the water is further minimized by carrying the channels 29 from the front ends of the chuck flutes 19 to the front end of the chuck with their forward ends clear of the tool collar 6 so that any air under pressure in the chuck cavity 30 may readily escape along the flutes to the open front end of the chuck casing.

The escape of air from the cylinder 2 to the chuck cavity 30 along the piston nose is minimized by forming a groove 31 in the front head of the machine and connecting said groove by a hole 32 with the neck 33 of an ejector 34. Exhaust air from the machine is passed by the passages 35 into said ejector, reducing the pressure in the hole 32 and the groove 31 and so withdrawing air which may be leaking along the piston nose.

The hole 36 produced in rock by a percussive drill tapers inwardly owing to the wear of the wings of the drill tool and, if several tools are employed, in succession, owing to their being of decreasing gauge.

The tapered steel here shown approximates to this form of the hole, so that the cross sectional area of the space between the tool and the wall of the hole is roughly equal throughout the length of the hole. That is to say, the cross sectional area of the column of sludge in the hole does not vary greatly throughout its length, its velocity of movement remains substantially unchanged and it therefore does not tend to drop its solid contents owing to reduced velocity. When the solid contents are not kept in suspension they tend to pack and bind the tool.

37 represents a rubber washer which is slipped over the stem of the drill. The tapered form of the stem resists movement of the washer rearwardly along the drill, and holds the washer in contact with the rock at the mouth of the bore hole so that it to some extent seals the latter, thus tending to keep the hole full of sludge and maintain the sludge in a thick condition which is most favourable for maintaining the rock chippings in suspension in the sludge and ensuring their prompt ejection from the hole without tendency to settle therein and bind the drill tool. The washer also tends to break up any air bubbles in the sludge and prevent them from discharging their contained dust into the atmosphere.

I claim:—

1. In a rock drill, a cylinder provided with an exhaust passage for air, a hammer piston slidable in the cylinder and provided with a nose, a front head for the cylinder fitting around the nose and having a circumferential air groove provided with an air escape passage, and an ejector tube having its rear part communicating with the said exhaust passage and having its front or outlet part connected with the said air escape passage and operating to eject the air from it.

2. In a rock drill, a cylinder provided with an exhaust passage at each end, a hammer piston which uncovers the cylinder exhaust passages alternately, said piston being provided with a nose, a front head for the cylinder fitting around the said nose and having a circumferential air groove provided with an air escape passage, and an ejector tube receiving air from the said exhaust passages and having an air passage at its delivery end portion which communicates with the said air escape passage and operates to eject air from the ejector tube.

HENRY SAMUEL POTTER.